Sept. 9, 1947.  R. E. HASELBERGER  2,427,211
CONTROL MECHANISM
Filed Dec. 18, 1944
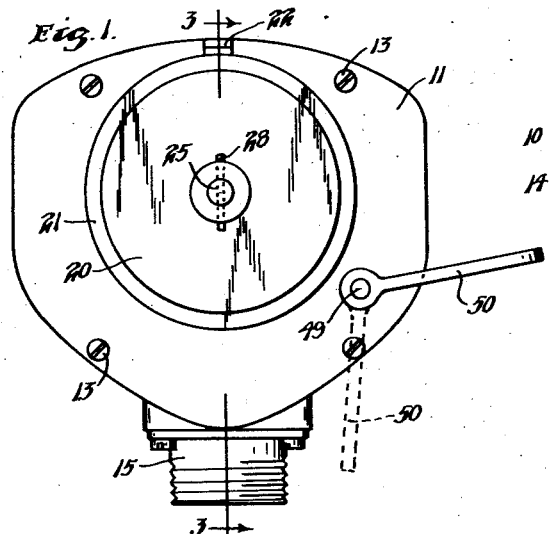
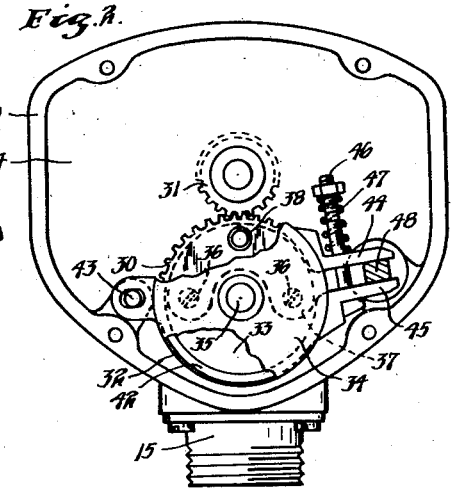
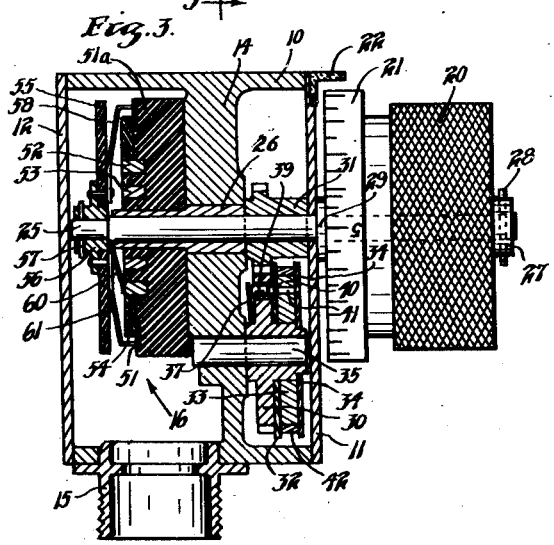
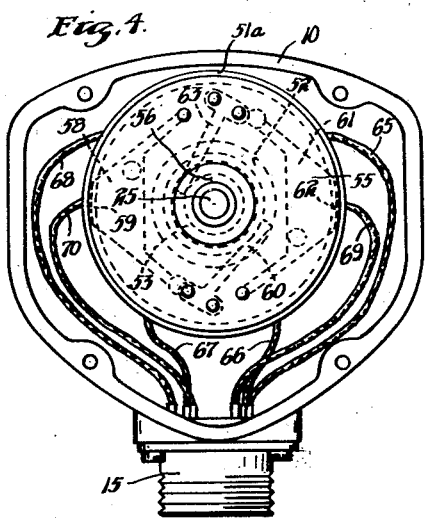
INVENTOR
RAYMOND E. HASELBERGER
BY *George H. Fisher*
ATTORNEY Patented Sept. 9, 1947

2,427,211

UNITED STATES PATENT OFFICE 2,427,211

CONTROL MECHANISM

Raymond E. Haselberger, St. Paul, Minn., assignor to Minneapolis-Honeywell Regulator Company, Minneapolis, Minn., a corporation of Delaware Application December 18, 1944, Serial No. 568,692

10 Claims. (Cl. 201—55)

My invention is related to a control mechanism having a manual member which is freely movable over a range of movement, but which has means for retaining a selected initial position at any place in the range of movement of the manual member which is operative to indicate the return of the manual member to the selected initial position.

While such a device may have wide utility in sighting devices or the like, where it is necessary to maintain an indicated initial position, it has particular use in controlling the steering mechanism of an aircraft. In such a capacity it is particularly applicable to aircraft of the class which are provided with automatic course control means. Under certain conditions of aircraft operation, even though automatic course control means are provided, it may be necessary for the operator to assume manual control of the course, as for example, to make a series of sharp turns in the course and then to assume a direction which is parallel to the original course. The present device allows manual control to be assumed under two conditions. In one instance the attitude of the aircraft may be altered without reference to the course selected by the automatic control mechanism and under these conditions the direction of the aircraft is entirely at the will of the operator. However, there are other times when the operator may wish to vary the course momentarily without loss of the original reference direction, wherein after a change of direction has been manually made, the aircraft may be directed to assume a course parallel to its original course. This latter mode of operation covers the principal use of the present device.

An object of my invention is to provide a mechanism having a manually controlled member with means for indicating a selected initial position of the manual member and means for indicating the return of the manual member to its previously selected initial position.

Another object is to provide a manual controller for a steering motor for use with an automatically controlled aircraft steering mechanism.

Other and further objects may become apparent from the following description and claims, and in the appended drawing in which:

Figure 1 is a top plan view of the control device;

Figure 2 is a top plan view of the device with the top cover removed;

Figure 3 is a cross section taken on the lines 3—3 of Figure 1, with the control knob shown in full view; and Figure 4 is a plan view of the back of the device with the back cover removed and certain parts shown in phantom.

Referring now to the drawings, the reference numeral 10 indicates a casing having a front cover 11 and a back cover 12 which are secured to the casing by counter-sunk screws 13. An integral web 14 is located within the interior of the casing 10, parallel to the front and back covers, to provide support for internal parts. A coupling 15 extends into the bottom portion of the casing to provide a passage for electrical connections to a potentiometer 16.

Positioned on the front cover 11 is a manually rotatable knob 20 having a knurled portion and a numerical scale 21. The scale 21 cooperates with a transparent index member 22. A shaft 25 which is supported by a bearing 26 in the web 14 extends through the knob 20 and is secured to the exterior of knob 20 by a collar 27 and pin 28 which may be a part of the knob structure. A washer 29 separates the knob 20 from the top portion of the casing cover 11.

Within the upper portion of the casing as determined by the web 14 is a gear train controlled by the rotatable knob 20. The gear train consists of a pinion gear 31 which is keyed to the shaft 25 and meshes with a driven gear 30 in a gear ratio of 2 to 1, that is, for two rotations of pinion 31 the driven gear 30 makes one rotation. Positioned adjacent the driven gear 30 and separated therefrom by a washer 32 is a disc 33 having another washer 34 of the same dimension as washer 32 located on its outer side. Gear 30, disc 33, and washers 32 and 34, are mounted for rotation on stud shaft 35 and under one condition to be explained later are freely rotatable with gear 30.

Secured to the inner or lower surface of gear 30 by screws 36 is a crescent-shaped spring 37 which is arranged to resiliently support within a sleeve 38 in gear 30, a movable pin 39 and an abutting sphere 40, which sphere passes through an aperture in washer 32 and is arranged to cooperate with an aperture 41 in disc 33 to provide a detent mechanism. When aperture 41 in disc 33 is in alignment with sleeve 38 of gear 30, spring 37 cooperating with pin 39 moves the sphere 40 within the aperture 41 of disc 33 whereby disc 33 is made to rotate in unison with gear 30.

A braking mechanism is provided for selectively arresting the rotation of disc 33 upon rotation of gear 30. It consists of circular bifurcated shoe 42 which is anchored to web 14 by a stud 43 and is provided with biasing arms 44 and 45. A bolt 46, supporting a spring 47, extends through the arms 44, 45, and serves to bias them in the direction of each other in such a manner that the brake shoe 42 grips the disc 33. The brake may be freed from engagement with the disc 33 by rotation of a brake lever 50, located on the exterior of the top casing cover 11. The lever 50 rotatably controls a stud 49 having a rectangular portion 48 which is positioned between the brake arms 44 and 45. When the lever 50 is in a horizontal position, shown in Figure 1 as the full line position, the brake 42 is resiliently held in engagement with disc 33 by the force of spring 47. The brake may be released by rotating the lever 50 downward to the dotted line position whereby the rectangular member 48 will spread the arms 44 and 45 to release the pressure of shoe 42 on disc 33.

With the parts as shown in Figures 2 and 3 and with the brake lever 50 located in the full line position of Figure 1, disc 33 is arrested against movement and the detent mechanism comprising the spring 37 pin 39 and sphere 40, will restrain gear 30 against free rotation. If it is attempted to rotate knob 20, the detent mechanism will restrain this movement and require a somewhat greater effort until after the detent mechanism has become disengaged from contact with aperture 41 in the disc 33 whereupon the sphere 40 will rotate on the smooth surface of disc 33 until it is again brought in alignment with aperture 41. Upon rotation of the knob 20 two full turns, or by reversing the direction of rotation, return to the original position will be indicated by reengagement of the sphere 40 with aperture 41. The reengagement will be accompanied by an audible click and a restoration of the restraining action or detent "feel." The foregoing describes the action which will take place when the brake lever 50 is in a horizontal or active position. If now the lever 50 is moved to its inactive position indicated by the dotted lines in Figure 1, the rectangular member 48 will separate the brake arms 44, 45, and by reason of engagement of the sphere 40 with aperture 41, the disc 33 will now freely rotate in unison with the gear 30. In this manner the disc 33 may be freely rotated if such action is desired, or it may be rotated to any selected position before applying the braking mechanism.

The variable resistor indicated by the general reference numeral 16 is a "solid" potentiometer having a very thin metallic ring 51 formed of resistance material such as a manganese alloy and is provided with four taps spaced equally on the ring. The ring 51 is mounted in a circular insulating member 51a which is fastened to the bottom portion of the web 14. A pair of collector rings 52 and 53 are concentric to the resistor ring 51 and located within a second insulating member 54. A rotatable disc of insulating material 55 is fastened to the lower end of shaft 25 by means of a hub 56 and pin 57. On the inner side of member 55, as seen in Figures 3 and 4, are a pair of spring contacts 58 and 61 for engaging the resistor ring 51, and the collector rings 52 and 53. Spring 58 is provided with a contact 59 which engages resistor ring 51 and with a brush 60 extending to the outer collector ring 52. Spring 61 is provided with a contact 62 extending to the resistor ring 51 and a brush 63 extending to the inner collector ring 53. The four lead wires 65, 66, 67, and 68 connect to the four taps of the potentiometer resistor ring 51, and leads 69 and 70 are connected respectively to the collector rings 52 and 53. The potentiometer 16 is intended to be operated in conjunction with a balancing potentiometer in a manner well known in the art, for controlling the operation of a servo-motor which in turn controls the attitude of the aircraft. It is to be understood that the potentiometer here disclosed is merely illustrative of one type of device that may be operated by my novel manual control mechanism.

Operation

The device in the form shown is primarily intended for steering an aircraft with relation to a reference point, which generally speaking will be the automatically selected direction of the autopilot; however, with the brake mechanism in an inoperative position as indicated by the dotted line position of the lever arm 50, the reference point is not maintained and a course may be chosen at the will of the operator. To select a reference point, which may for example be the automatically selected direction of the autopilot, the knob 20 is rotated with the brake lever 50 in a vertical position as indicated by the dotted line position in the drawing, until the "zero" on the index 21 coincides with a hair line on the member 22. Although "zero" is herein selected as an initial position of the dial, it should be understood that any position may be selected as the initial position or reference point. With the brake in an inoperative position disc 33 rotates in unison with gear 30 because of the engagement of detent sphere 40 with the aperture 41 in the disc 33 and at this selected position the detent mechanism will be in the position shown in Figure 2. To maintain the reference point the brake lever 50 is rotated to the upward position shown as a full line position in Figure 1. The resulting rotation of member 49 causes a pressure to be exerted on arms 44 and 45 by spring 47 to force the brake shoe 42 into engagement with the outer periphery of disc 33 to arrest its movement. With the reference point thus secured, the knob 20 and the movable portion 55 of potentiometer 16 may be rotated in either direction; clockwise movement produces a right turn and counter-clockwise movement produces a left turn of the aircraft. The scale 21 is marked off in ten degrees in either direction from the zero position so that an accurate position of the new course of the craft may be selected by observing the numerals; however, because of the 2–1 ratio existing between the pinion 31 and the gear 30, the knob 20 may be rotated just short of twice without loss of the reference point, or in other words the aircraft may be turned in either direction to an extent just short of 40 degrees. Although the detent mechanism will engage after two full turns of the dial this will not prevent further turning of the dial and thus also of the aircraft, but for the contemplated use of the device, less than two turns of the dial is sufficient. This feature may be altered by varying the gear ratio between pinion 31 and the driven gear 30. As soon as the dial 20 is moved from the reference position a certain amount of resistance will be felt in the hand of the operator, as the detent sphere 40 is caused to move out of engagement with the aperture 41 in the disc 33, but thereafter the detent sphere 40 slides on the smooth suface of disc 33 and no further resistance is felt. To return the aircraft to its original reference course, the knob 20 is rotated in a reverse direction until the detent sphere 40 again engages aperture 41 which will cause an audible click together with a certain amount of resistance against further movement which will prevent overshooting. As it is conceivable that the operator may wish to use this control mechanism without visibly observing the index 21, the detent mechanism through the "feel" that it produces is a positive manner of assuring him of its return to the original reference position.

It should be understood that any selected reference point may be chosen before making the braking mechanism operative to preserve the reference point, and that any variation in the ratio between the pinion 31 and the gear 30 may be provided so that the manual member may be rotated for the proper number of turns without loss of the reference point. It is within the spirit of this invention that this manner of retaining a reference point need not necessarily be limited to the use of a potentiometer nor to an aircraft steering mechanism.

I claim as my invention:

1. A control mechanism, comprising, a first member mounted for pivotal movement about a central axis, a second member mounted adjacent said first member and being normally adapted for movement in a plane parallel to said first member, means for releasably joining said first and said second members to provide pivotal movement of said second member in unison with said first member, and means selectively operable to arrest the movement of said second member at any position of said first member in such a manner that on movement of said first member from the selected position said first named means becomes operative to indicate return of said first member to said selected position.

2. A control mechanism, comprising, a manually movable member, a reference mechanism having two relatively movable parts the first of which moves with said member and means for indicating when said parts move in respect to each other out of a predetermined relative position and their return to such relative position, and means operable on the second of said parts at any position of said manual member selectively to cause relative movement between said parts or to cause said parts to move together upon movement of said manual member.

3. A control mechanism, comprising, a manually movable member, another movable member positioned adjacent said manually movable member, a resilient detent mounted on one of said members engageable in an aperture in the other member forming a resilient connection between said two members to move said other member in unison with said manual member, and manual means for securing said other member against movement at a selected position of said manual member whereby on movement of said manual member said detent becomes disengaged from said apertured member.

4. A control mechanism, comprising, a manually movable member, a gear train movable in response to movement of said member, another member positioned adjacent one gear of said train, said member and said gear being provided with coinciding apertures, a resiliently mounted detent positioned in one aperture and engaging with the coinciding aperture in the other member in such a manner so that said gear and said other member rotate in unison, and brake means for securing said other member against rotation at any selected position of said manual member whereby movement of said manual member disengages said detent from said aperture, whereby the return of said one gear with relation to said other member is indicated by engagement of said detent and aperture.

5. A control mechanism, comprising, a manually movable member, a reference member cooperable with said manually movable member, detent means carried by one of said members for engaging the other member in such a manner that said reference member moves in unison with said manually movable member when the latter is moved, and a locking device for securing said reference member in a selected position in such a manner that on movement of said manually movable member thereafter said detent means becomes operative to indicate the departure and return of said manually movable member with respect to said selected position.

6. A control mechanism, comprising, a manually movable member, a second movable member, means including detent means normally connecting said second member to said manually movable member for movement therewith, and locking means operable in any position of said manual member to prevent movement of said second member so that movement of said manual member thereafter causes separation of said detent means until said manual member is returned to the position at which said locking means was operated.

7. A control mechanism, comprising in combination, a resistor, a movable conductor in sliding engagement with said resistor, manual means for moving said conductor with relation to said resistor, reference means cooperable with said manual means for indicating an initial position of said manual means corresponding to an initial relationship between said conductor and said resistor, said reference means comprising first and second relatively movable parts the first of which always moves in unison with said manual means, detent means carried by one of said parts cooperable with the other part to cause both of said parts to move in unison with said manual means, and adjustable means to arrest the movement of the second part at any initial position of said manual means causing said detent means to become operative to indicate departure and return of said manual means with respect to said initial position.

8. A control mechanism, comprising in combination, a control device to be positioned in any one of a plurality of positions, manual means for positioning said control device, a reference mechanism cooperable with said manual means for indicating an initial position of said manual means and said control device, said reference mechanism comprising two relatively movable parts, means operable at any position of said manual means to cause relative movement between said parts upon movement of said manual means, and means for indicating when said manual means is moved with respect to its initial position and its return thereto.

9. A control mechanism, comprising in combination, a control device to be positioned in any one of a plurality of positions, manual means for positioning said control device, a reference mechanism cooperable with said manual means for indicating an initial position of said manual means and said control device, said reference mechanism comprising two relatively movable parts one of which is movably controlled by said manual means, means carried by one of said parts cooperable with the other part to cause both of said parts to move in unison with said manual means, and means for locking the other of said parts in any position of said manual means to cause said first named means to indicate movement of said manual means with respect to said initial position.

10. In a control mechanism, in combination, a manually movable member, reference means cooperable with said manually movable member for indicating a selected initial position of said member, means for securing said reference means in a selected initial position of said manual member, comprising, a brake structure having an extending arm portion, resilient means for biasing said arm portion in a direction to fix the position of said reference means, and a rotatable member for moving said arm portion to an inoperative position.

RAYMOND E. HASELBERGER.

REFERENCES CITED

The following references are of record in the file of this patent:

UNITED STATES PATENTS

| Number | Name | Date |
| --- | --- | --- |
| 1,581,676 | Chairns | Apr. 20, 1926 |
| 2,195,813 | De Giers | Apr. 2, 1940 |
| 2,177,482 | Hall | Oct 24, 1939 |
| 2,069,440 | Hathorn | Feb. 2, 1937 |
| 1,834,272 | Enderwood | Dec. 1, 1931 |
| 1,977,397 | Morel | Oct. 16, 1934 |
| 2,095,100 | Maillard | Oct. 5, 1937 |